United States Patent
Madsen et al.

(10) Patent No.: US 8,224,407 B2
(45) Date of Patent: Jul. 17, 2012

(54) MOBILE DEVICE HAVING A MOVABLE DISPLAY AND ASSOCIATED SYSTEMS AND METHODS

(75) Inventors: Jesse S. Madsen, Oakland, CA (US); William D. Webb, II, San Francisco, CA (US); Sung H. Kim, Palo Alto, CA (US); Colin A. Davis, New Orleans, LA (US)

(73) Assignee: T-Mobile USA, Inc., Bellevue, WA (US)

( * ) Notice: Subject to any disclaimer, the term of this patent is extended or adjusted under 35 U.S.C. 154(b) by 479 days.

(21) Appl. No.: 12/409,433

(22) Filed: Mar. 23, 2009

(65) Prior Publication Data
US 2010/0240425 A1 Sep. 23, 2010

(51) Int. Cl.
*H04M 1/00* (2006.01)
(52) U.S. Cl. .................... 455/575.4; 455/566
(58) Field of Classification Search ............... 455/575.4, 455/566
See application file for complete search history.

(56) References Cited

U.S. PATENT DOCUMENTS

| | | | |
|---|---|---|---|
| 7,016,704 B2 | 3/2006 | Pallakoff | |
| 7,252,511 B2 | 8/2007 | Santos et al. | |
| 7,400,913 B2 | 7/2008 | Richter et al. | |
| 7,460,108 B2 | 12/2008 | Tamura | |
| 2005/0078817 A1 | 4/2005 | Lee | |
| 2005/0107137 A1 | 5/2005 | Byun et al. | |
| 2006/0056141 A1 | 3/2006 | Pihlaja et al. | |
| 2006/0135229 A1 | 6/2006 | Kwak et al. | |
| 2007/0123318 A1* | 5/2007 | Joo | 455/575.1 |
| 2007/0123322 A1 | 5/2007 | Mizushina | |
| 2007/0153465 A1 | 7/2007 | Shih et al. | |
| 2007/0254730 A1 | 11/2007 | Kim et al. | |
| 2007/0287512 A1 | 12/2007 | Kilpi et al. | |
| 2007/0293283 A1* | 12/2007 | Inubushi et al. | 455/575.1 |
| 2007/0293286 A1 | 12/2007 | Park et al. | |
| 2008/0039155 A1 | 2/2008 | Kim | |
| 2008/0064448 A1 | 3/2008 | Huang | |
| 2008/0207272 A1 | 8/2008 | Thornton et al. | |
| 2008/0232070 A1 | 9/2008 | Kuwajima et al. | |
| 2008/0287169 A1 | 11/2008 | Kim et al. | |
| 2008/0304218 A1 | 12/2008 | Park et al. | |

(Continued)

FOREIGN PATENT DOCUMENTS

| | | |
|---|---|---|
| EP | 1583331 A1 | 10/2005 |
| EP | 1887761 A2 | 2/2008 |
| KR | 20050035455 A | 4/2005 |
| WO | WO-2009009154 A1 | 1/2009 |

OTHER PUBLICATIONS

International Search Report and Written Opinion for PCT/US2010/028186, Filed on Mar. 22, 2010, Applicant: T-Mobile USA, Inc., Date of Mailing: Nov. 4, 2010, 8 pages.

(Continued)

*Primary Examiner* — Jean Gelin
*Assistant Examiner* — Michael Mapa (57) ABSTRACT

Mobile devices having movable displays and associated systems and methods are disclosed herein. A mobile communication device configured in accordance with one embodiment of the disclosure, for example, including a first component having a front side and a first periphery edge, and a second component operably coupled to the first component. The second component is rotatably movable about the front side of the first component into at least first, second, and third operating positions. The second component includes a second periphery edge, and the first and second periphery edges remain generally parallel with each other as the second component rotatably moves between the first, second, and third operating positions.

21 Claims, 8 Drawing Sheets

U.S. PATENT DOCUMENTS

| | | |
|---|---|---|
| 2009/0005135 A1 | 1/2009 | Lindgren et al. |
| 2009/0075702 A1* | 3/2009 | Kubodera et al. .............. 455/566 |
| 2010/0159995 A1 | 6/2010 | Stallings et al. |
| 2010/0240402 A1 | 9/2010 | Wickman et al. |
| 2010/0240417 A1 | 9/2010 | Wickman et al. |
| 2010/0240425 A1 | 9/2010 | Madsen et al. |

OTHER PUBLICATIONS

"MOTOROKR™ E8," User Guide, 106 pages.

"Motorola ROKR E8 and its Morphing Keypad," YouTube, Jan. 7, 2008, 2 pages.

International Search Report and Written Opinion for PCT/2010/028183, Filed on Mar. 22, 2010, Applicant: T-Mobile USA, Inc., Date of Mailing: Oct. 15, 2010, 9 pages.

Malykhina, Elena, "Mode Shift Helps Motorola Rokr E8 Stand Out," InformationWeek, Jan. 16, 2008, 2 pages.

Spindel, Jacob, "Motorola RAXR2 V9m," Mobile Tech Review, Nov. 14, 2007, 5 pages.

Zhang, Tong, "LG Chocolate 3," Mobile Tech Review, Aug. 11, 2008, 5 pages.

* cited by examiner

MOBILE DEVICE HAVING A MOVABLE DISPLAY AND ASSOCIATED SYSTEMS AND METHODS

TECHNICAL FIELD

The present disclosure is directed to a mobile device having a movable display and associated systems and methods.

BACKGROUND

Currently, mobile devices and related accessories facilitate communication in a number of different ways: users can send email messages, make telephone calls, send text and multimedia messages, chat with other users, and so on. That is, mobile devices allow users to not only make voice calls, but also send written messages via e-mail, instant messaging ("IM"), texting via short messaging service (SMS) or multimedia messaging service (MMS), messaging via social networks (often over the internet protocol (IP)), etc. Moreover, mobile devices can play music, games, videos, and so on. As these devices have added features and become more powerful, users have also demanded that the devices become smaller and more portable.

Some mobile devices provide a traditional numeric keypad along with a few additional buttons. Other mobile devices provide a full alphanumeric keyboard, or a touch screen that depicts the keyboard. Many of these devices include a display and a keypad/keyboard that can move relative to each other. For example, flip phones have a display that can pivot relative to the keyboard, while many smart phones have a keyboard that can slide relative to the screen. While these arrangements have been successful for many devices, there is a continual need to improve the overall arrangement and compactness of mobile devices.

DETAILED DESCRIPTION

The present disclosure describes mobile devices having movable displays and associated systems and methods. For example, a mobile device that has at least three modes or levels of engagement for a user is described in detail below. The modes of engagement can be selected based on movement of an element on the mobile device. In one example, the mobile device employs a mechanism (e.g., a gear mechanism) operably coupled between two different components of the mobile device and configured to move the two components relative to each other and thereby cause the mobile device to enter the selected mode or state—a passive mode or state, a semiactive state, and an active state.

Many specific details of certain embodiments of the disclosure are set forth in the following description and in FIGS. 1A-7 to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments may be practiced without several of the details described below. Where the context permits, singular or plural terms may also include the plural or singular term, respectively. Moreover, unless the word "or" is expressly limited to mean only a single item exclusive from the other items in reference to a list of two or more items, the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

A. EMBODIMENTS OF MOBILE DEVICES HAVING MOVABLE DISPLAYS AND ASSOCIATED SYSTEMS AND METHODS

Figure 1A:
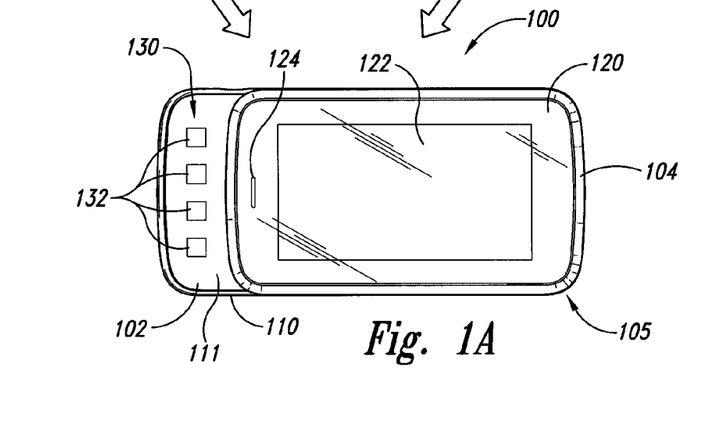
FIGS. 1A-1C are top plan views of a mobile device in a first, second, and third operating mode, respectively, and configured in accordance with an embodiment of the disclosure.
Figure 1B:
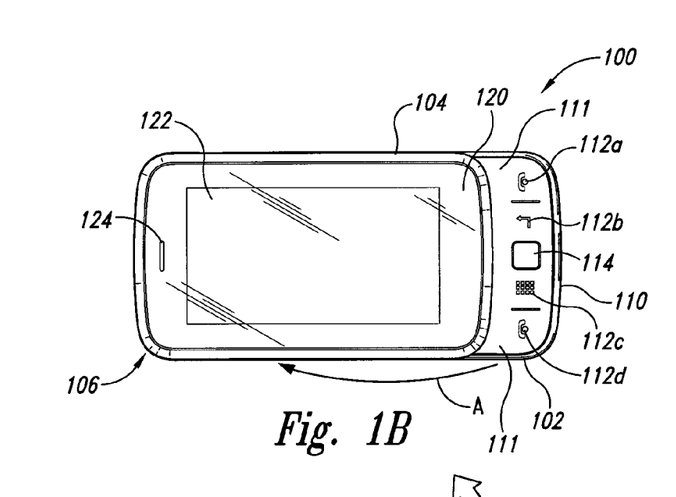
Figure 1C:
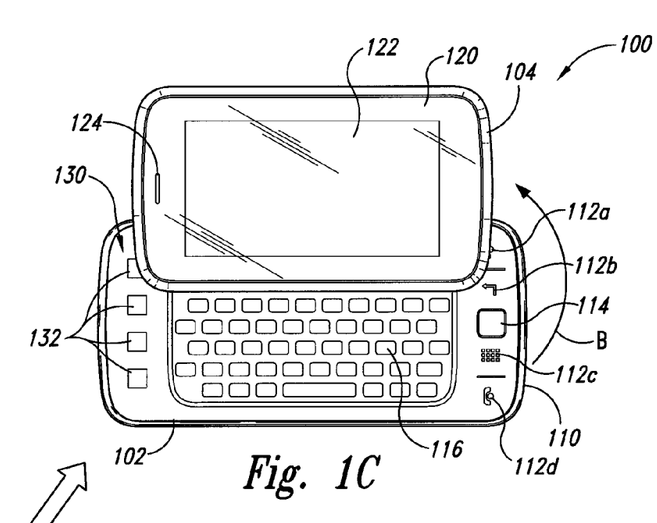

FIGS. 1A-1C are top plan views of a wireless mobile communication device 100 in a first, second, and third operating mode, respectively, and configured in accordance with an embodiment of the disclosure. FIG. 1A, for example, is a top view of the mobile device 100 in the first or passive operating mode. The mobile device 100 can include a first portion or component 102 and a second portion or component 104 carried by and movably engaged with the first component 102. The second component 104 is generally coplanar with the first component 102. As described in greater detail below, the second component 102 can rotatably move relative to the first component 102 to at least three different operating positions and thereby cause the mobile device 100 to enter two other modes or states. In the illustrated position, for example, the second component 104 is positioned adjacent to a first end 105 of the first component 102 to put the mobile device 100 into the first operating mode or state. As described in greater detail below, the first or Passive Mode is a passive, low engagement, low power usage mode for the mobile device 100.

The first component 102 includes a first or mobile device housing 110 configured to carry a number of input/output components and other electronic and mechanical components of the device 100. For example, the first end 105 of the first housing 110 can include one or more input buttons (described in detail below with reference to FIG. 1B) and a second end 106 of the first housing 110 can include a status bar 130 having one or more status indicators 132 (shown schematically) configured to provide information about the mobile device 100, incoming or outgoing messages (e.g., phone calls, e-mail messages, text messages, voicemail messages, social network status messages, etc.), or other types of information. Further specific details regarding the status bar 130 and associated systems and methods are provided in U.S. patent application Ser. No. 12/409,473, filed Mar. 23, 2009, and entitled "SECONDARY STATUS DISPLAY FOR MOBILE DEVICE", which is incorporated herein by reference in its entirety. In other embodiments, the status bar 130 can have a different configuration and/or include different features.

The second component 104 includes a second or display housing 120 carried by the first housing 110 and movable about a first or front side 111 of the first housing 110. The second component 104 also includes a display 122 (e.g., a liquid crystal display (LCD) or organic LCD (OLED), plasma display, electronic ink (eink)) carried by the second housing 120 and generally coplanar with the front side 111 of the first housing 110. The second housing 120 can also include a speaker 124 and a variety of other electronic or mechanical components. A user interfaces with the mobile device 100 via user input components (e.g., input buttons (FIG. 1B), microphone, a keyboard (FIG. 1C), touchscreen, track ball or track pad 114 (FIG. 1B), voice recognition system, etc.) and/or user output components (e.g., display 122, speaker 124, etc.).

The mobile device 100 can also include various other computing components, such as those generally found in smart phones, cellular phones, handheld e-mail devices, personal digital assistants (PDAs), tablet computers, gaming devices, or other such mobile devices. For example, although not shown in the embodiment illustrated in FIG. 1A for purposes of clarity, the mobile device 100 can include a power subsystem, data storage to store programs and data, and at least one data processor to run an operating system and a variety of different applications. The mobile device 100 can also include hardware and operating instructions stored in memory for wirelessly transmitting and receiving data according to one or more wireless protocols. Such protocols include short range protocols (e.g., Bluetooth, Wi-Fi, Ultra-wideband, and ZigBee) and radio-access network protocols (e.g., GSM (Global System for Mobile Communications), CDMA (Code Division Multiple Access), UMTS (Universal Mobile Telecommunications System), EDGE (Enhanced Data for GSM Evolution), LTE (Long Term Evolution), Wimax (Worldwide Interoperability for Microwave Access), Voice Over Internet Protocol (VoIP), UMA/GAN (Unlicensed Mobile Access/Generic Access Network)). In still other embodiments, the mobile device 100 can include other hardware and/or software components.

The Passive Mode is a passive or low engagement mode for the mobile device 100 in which the display 122 is typically turned off. One advantage of this operating mode is that a user can receive instant or approximately instant notification of incoming messages (via the status bar 130) without having to power on the full display 122. Keeping the display 122 off can significantly reduce the power consumption of the mobile device 100 and, accordingly, is expected to extend battery life of the device. Moreover, the user can still receive a constant stream of information (via the status bar 130) of incoming messages and information.

Referring next to FIG. 1B, the second component 104 is rotatably moved along a curved or nonlinear path relative to the first component 102 (as shown by the arrow A) to position the second component adjacent to the second end 106 of the first component 102 and put the mobile device 100 in a second or semiactive mode. The Semiactive Mode may be a "phone" mode in which the mobile device 100 is primarily configured for making and receiving phone calls. Although the mobile device 100 may be able to make and/or receive phone calls in the other operating modes, the Semiactive Mode is the primary operating mode for making/receiving phone calls.

As mentioned previously, the first housing 110 can include one or more input buttons 112 (four are shown in FIG. 1B as 112a-d) and an input device 114 (e.g., a track ball or track pad). Although not shown in FIG. 1B, the first housing 110 can also include a number of other input components (e.g., a camera, microphone, etc.) to accept input from a user, output components (e.g., headphone port, speaker, etc.) to provide feedback to a user, and communication ports (e.g., USB port, etc.) for connecting the mobile device 100 to an external device (e.g., a personal computer). In other embodiments, the mobile device 100 can include different input components and/or the input components can have a different arrangement.

FIG. 1C illustrates the mobile device 100 in the third operating mode. The third mode is an active mode in which the mobile device 100 may provide full access to all or substantially all device functionality. For example, the Active Mode may provide full access to any application or functionality benefiting from, for instance, a physical keyboard, such as "messaging." In this configuration, the second component 104 has been pivotably or rotatably moved along a curved path (as shown by the arrows B) relative to the first component 102 until the second component 104 is offset from at least a portion of the first component 102 to expose a keyboard 116. Further details regarding the pivotal movement of the second component 104 relative to the first component 102 are provided below with reference to FIGS. 2A-6C. In the illustrated embodiment, the keyboard 116 is a QWERTY keyboard. In other embodiments, however, the keyboard 116 can include other types of keyboards (e.g., Dvorak keyboard, QWERTZ keyboard, AZERTY keyboard, Colemak keyboard, etc.), a touch pad, a handwriting tablet, or other suitable input components. The first and/or second components 102 and 104 can also include other mechanical and/or electrical features (e.g., input buttons, displays, etc.) proximate to the keyboard 116. Further specific details regarding the three different operating modes or states of the mobile device 100 and associated systems and methods are provided in U.S. patent application Ser. No. 12/409,473, filed Mar. 23, 2009, and entitled "MULTIFUNCTION MOBILE DEVICE HAVING A MOVABLE ELEMENT OR DISPLAY AND ASSOCIATED FUNCTION", which is incorporated herein by reference in its entirety.

Figure 2A:
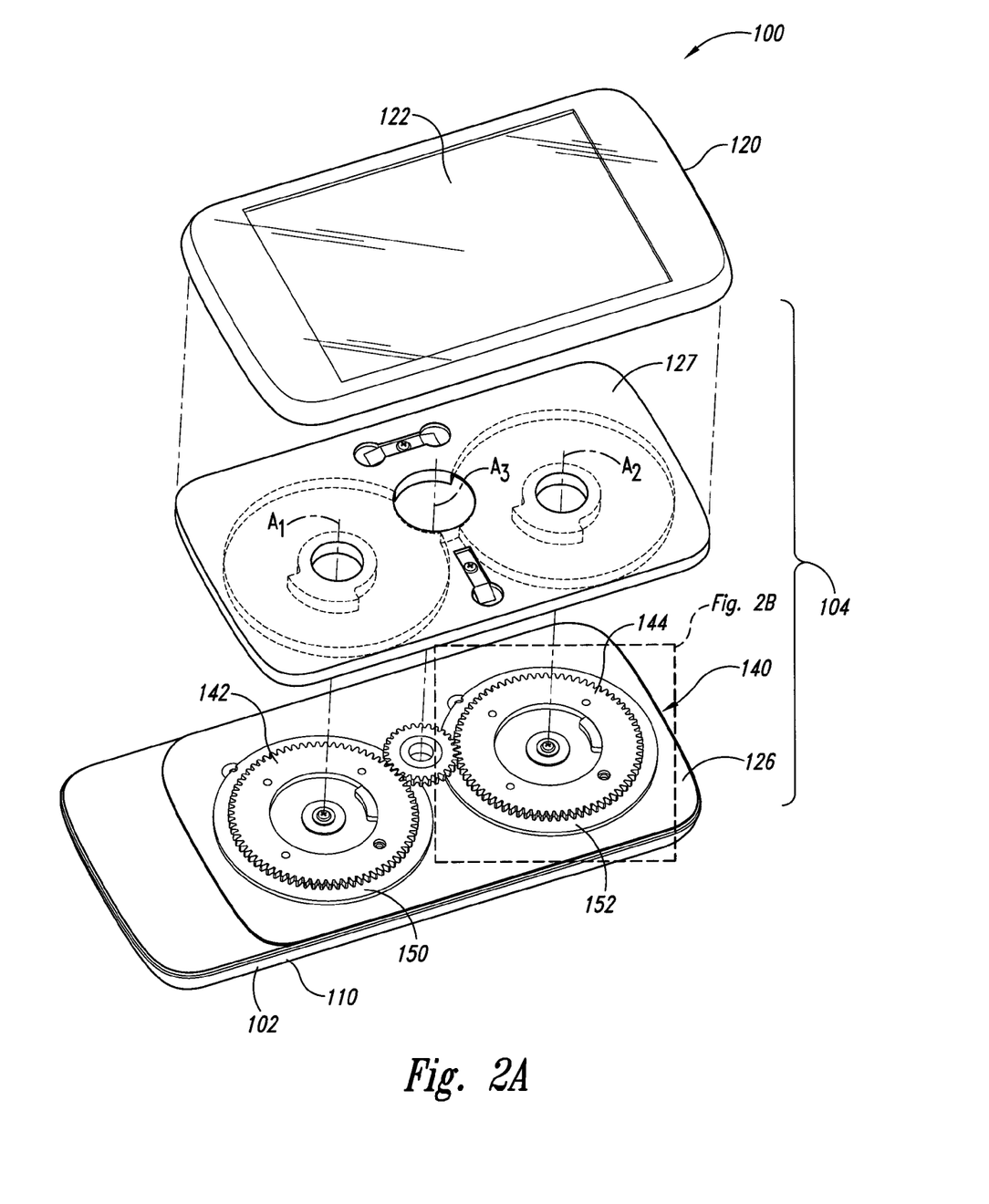
FIG. 2A is a partially exploded, front isometric illustration of the mobile device of FIGS. 1A-1C.
Figure 2B:
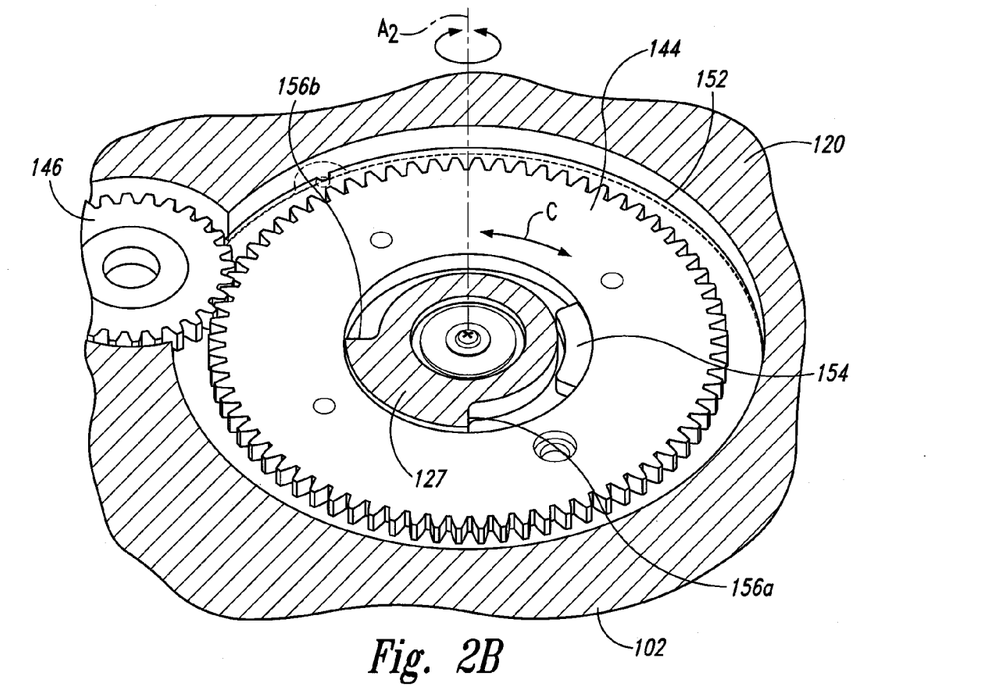
FIG. 2B is an enlarged and partially cut-away illustration of the area 2B of FIG. 2A.

FIG. 2A is a partially exploded, front isometric illustration of the mobile device 100 of FIGS. 1A-1C. A number of features of the first and second components 102 and 104 are not shown for purposes of illustration. The second component 104 can include a gear assembly or mechanism 140 operably coupled between the first and second components 102 and 104. The gear assembly 140 is configured to rotatably move the second component 104 relative to the first component 102. A first or front portion of the gear assembly 140 is shown in FIGS. 2A and 2B, and a second or back portion of the gear assembly 140 is described below with reference to FIGS. 3-4B.

The gear assembly 140 includes a first gear 142 and a second gear 144 adjacent to and arranged generally co-planar with each other. The first gear 142 is operably coupled to a first rotating feature 150, and the second gear 144 is operably coupled to a second rotating feature 152. The first and second rotating features 150 and 152 are configured to rotatably move with the corresponding first and second gears 142 and 144. The gears 142 and 144 and rotating features 150 and 152 are carried by and operably coupled to a base portion 126 of the second housing 120. The first and second rotating features 150 and 152 are described in greater detail below with reference to FIGS. 4A and 4B.

The first gear 142 is configured to rotate about a first axis $A_1$, and the second gear 144 is configured to rotate about a second axis $A_2$. The first and second gears 142 and 144 are operably coupled to each other via a third gear 146. The third gear 146 is configured to rotate about a third axis $A_3$. In the illustrated embodiment, the first and second gears 142 and 144 are identical or at least approximately identical in size, and the third gear 146 is smaller than the first and second gears 142 and 144. In other embodiments, however, the first and second gears 142 and 144 can be different sizes.

The first and second gears 142 and 144 are configured to rotate in sync about the first and second axes $A_1$ and $A_2$, respectively, in the same direction (e.g., counterclockwise), and the third gear 146 is configured to rotate about the third axis $A_3$ in the opposite direction (e.g., clockwise). The third gear 146 is configured to allow the first and second gears 142 and 144 to rotate in the same direction at the same speed, and prevent the first and second gears 142 and 144 from rotating out of sync with each other. As discussed in greater detail below with reference to FIGS. 5A-6C, rotating the first and second gears 142 and 144 in sync with one another keeps the top and bottom edges of the display 122 generally parallel with the top and bottom edges of the first component 102 (FIGS. 1A-1C) as the second component 104 moves relative to the first component 102 between the three different positions or states.

FIG. 2B is an enlarged and partially cut-away illustration of the area 2B of FIG. 2A. Although only the second gear 144 and second rotating feature 152 are shown, it will be appreciated that the first gear 142 and first rotating feature 150 can include generally similar or identical features. The second rotating feature 152 includes an alignment or indexing feature 154 at an inner periphery of the second gear 144. In the illustrated embodiment, the alignment feature 154 is an integral component of the second rotating feature 152. In other embodiments, however, the alignment feature 154 may be a separate component attached to the second rotating feature 152 at a desired location.

As the second gear 144 and second rotating feature 152 rotate about the second axis $A_2$ (as shown by the arrow C), the alignment feature 154 is configured to engage or contact one or more corresponding hard stops or stand-off features 156 (two are shown as a first stop 156a and a second stop 156b), and thereby stop or limit further rotational movement of the gear assembly 140 (FIG. 2A) in the respective direction. In the illustrated embodiment, the stops 156a and 156b are integral parts of an inner surface 127 of the upper portion (not shown) of the second housing 120, and are positioned at the desired location when the upper portion is mated with or engaged with the base portion 126 (FIG. 2A) of the second housing 120. For purposes of illustration, the other features of the upper portion of the second housing are not shown in FIG. 2B. In other embodiments, the stops 156a and 156b may have a different arrangement and/or may be carried by a different portion of the second component 104.

The first and second stops 156a and 156b are arranged to limit or prevent rotation of the second gear 144 and second rotating feature 152 about the second axis $A_2$ past a certain extent, and thereby position the second component 104 (FIGS. 1A-1C) at the desired location relative to the first component 102 (FIGS. 1A-1C). In the embodiment shown in the FIG. 2B, for example, the first stop 156a corresponds to the second or Semiactive Mode, and the second stop 156b corresponds to the third or Active Mode. Further details regarding the alignment feature 154 and the stops 156a and 156b are discussed below with reference to FIGS. 5A-6C.

Figure 3:
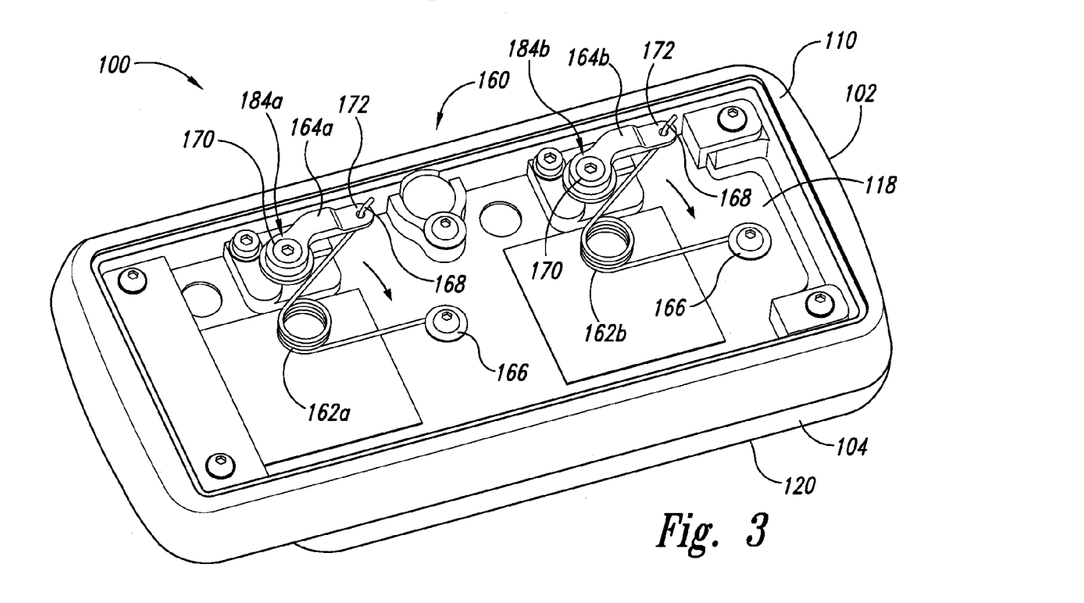
FIG. 3 is a partially exploded, rear isometric illustration of the mobile device of FIGS. 1A-1C.

FIG. 3 is a partially exploded, rear isometric illustration of the mobile device 100 of FIGS. 1A-1C. A back or bottom portion of the first component 102 of the mobile device 100 has been removed for purposes of illustration. The first component 102 includes a second or back portion of the gear assembly 140 that is engaged with our mated with the first or front portion of the gear assembly 140 described above with reference to FIGS. 2A and 2B. The second or back portion of the gear assembly 140 includes an urging assembly 160 configured to be engaged with or mated with the first portion of the gear assembly 140 (FIG. 2A). The urging assembly 160 can include, for example, a first urging member 162a and a second urging member 162b operably coupled to a first arm or crank portion 164a and a second arm or crank portion 164b, respectively. In the illustrated embodiment, the first and second urging members 162a and 162b are each generally V-shaped torsion springs having (a) a first end 166 fixedly attached to a base portion 118 of the first housing 110, and (b) a second end 168 coupled to the corresponding first and second arms 164a and 164b.

The first and second arms 164a and 164b are rotatable features having a first end 170 rotatably coupled to a portion of the corresponding rotating features 150 and 152 (as described in greater detail below with reference to FIG. 4B) and a second end 172 in contact with the second ends 168 of the corresponding springs 162a and 162b. In operation, the first and second springs 162a and 162b naturally want to open to their original V-shaped configuration. The spring force from the first and second springs 162a and 164b help rotatably move or drive the respective first and second arms 164a and 164b to the desired angular location. In other embodiments, the urging assembly 160 can have a different arrangement and/or include different features. For example, the urging members 162 can different types of springs or other suitable urging members and/or the arms 164 can have a different configuration.

Figure 4A:
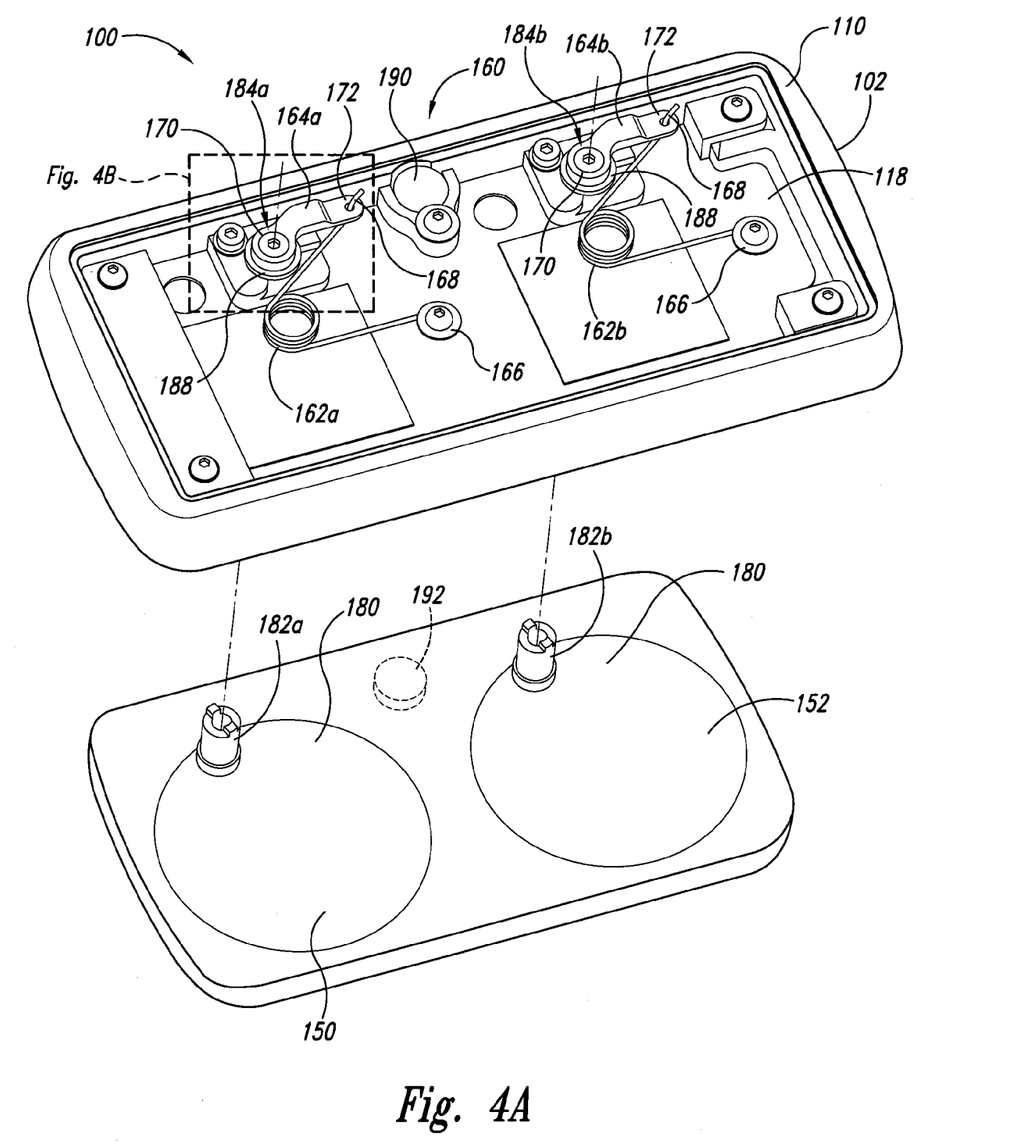
FIG. 4A is a partially exploded, isometric illustration of the mobile device of FIGS. 1A-1C in an inverted configuration.
Figure 4B:
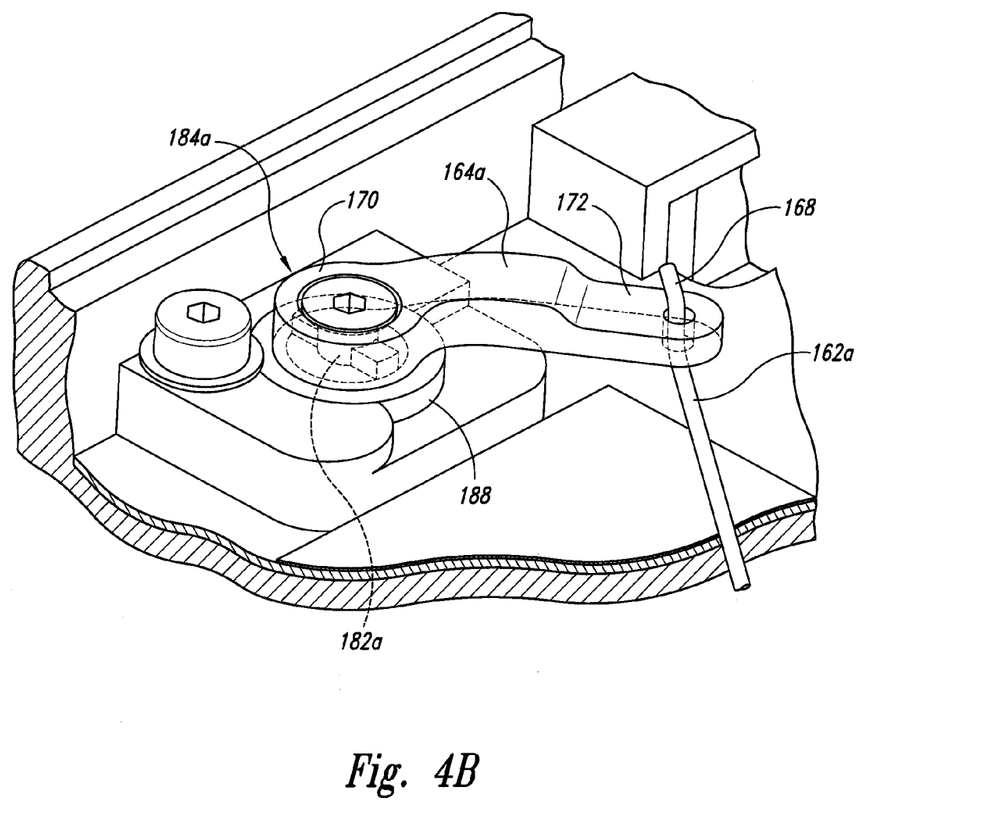
FIG. 4B is an enlarged and partially cut-away illustration of the area 4B of FIG. 3.

FIG. 4A is a partially exploded, isometric illustration of the mobile device 100 in an inverted configuration, and FIG. 4B is an enlarged and partially cut-away illustration of the area 4B of FIG. 4A. Referring to FIGS. 4A and 4B together, the first and second rotating features 150 and 152 each include a back side 180 facing the urging assembly 160, and first and second engagement or key features 182a and 182b, respectively, projecting from the back side 180 toward the urging assembly 160. The engagement features 182a and 182b are integral portions of the first and second rotating features 150 and 152, respectively, and are configured to rotatably move along with the gear assembly 140 (FIG. 2A).

The first engagement feature 182a is configured to engage or mate with the first arm portion 164a, and the second engagement feature 182b is configured to engage or mate with the second arm portion 164b. More specifically, as best seen in FIGS. 3 and 4B, when the first and second components 102 and 104 (and the first and second portions of the gear assembly 140) are mated together, at least a portion of each engagement feature 182a and 182b is engaged with and operably coupled to the first end 170 of the corresponding arms 164a and 164b to form a first and a second interface portion or connection 184a and 184b, respectively. Although only the first arm 164a and first engagement feature 182a are show in FIG. 4B, it will be appreciated that the second arm 164b and second engagement feature 182b can include a generally similar or identical arrangement.

The interface portions 184a and 184b operably couple the first or front portion of the gear assembly 140 (the first, second, and third gears 142, 144, 146) to the second or rear portion of the gear assembly 140 (the urging assembly 160). In this way, as mentioned above, the spring force from the first and second springs 162a and 162b can be used to rotatably move or drive the gear assembly 140 (and, accordingly, the second component 104 of the mobile device 100) to the desired operational position or mode. In several embodiments, a bearing 188 can be positioned in contact with each engagement feature 182 and the corresponding arm 164. The bearing 188 can help enable smooth rotation of the features relative to each other. The bearing 188 is an optional component that may not be included in some embodiments.

As best seen in FIG. 4A, the mobile device 100 may also include one or more detents configured to assist in maintaining the second component 104 at a desired position relative to the first component 102. For example, the first component 102 can include a first magnet 190 and the second component 104 can include a second magnet 192 (shown schematically in broken lines). The first and second magnets 190 and 192 can be arranged relative to each other such that the attractive force between the magnets 190 and 192 maintains the second component 104 at a desired position relative to the first component 102 (e.g., in the first or Passive Mode). In other embodiments, one or more additional detents (e.g., magnets) may be used to help maintain the first and second components 102 and 104 at a desired position relative to each other. Moreover, the detents may include other types of suitable devices in addition to, or in lieu of, magnetic media. The detents are an optional component that may not be included in some embodiments.

Figure 5A:
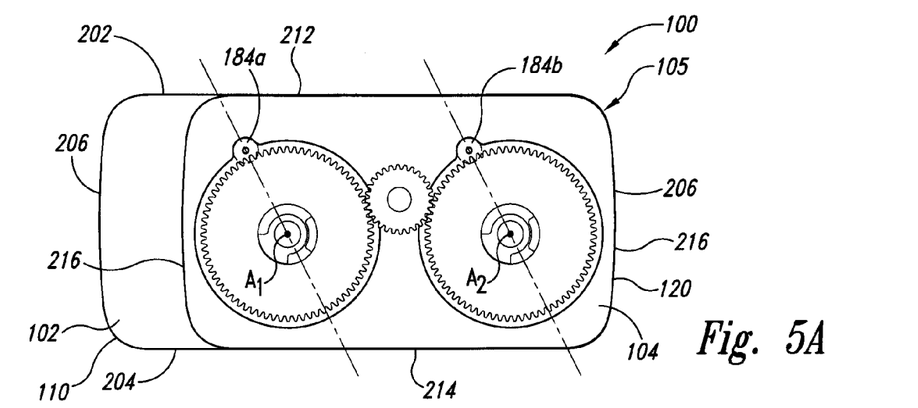
FIGS. 5A-5C are partially schematic, transparent, top plan views of the mobile device of FIGS. 1A-1C illustrating the device moving from the first operating mode to the second operating mode.
Figure 5B:
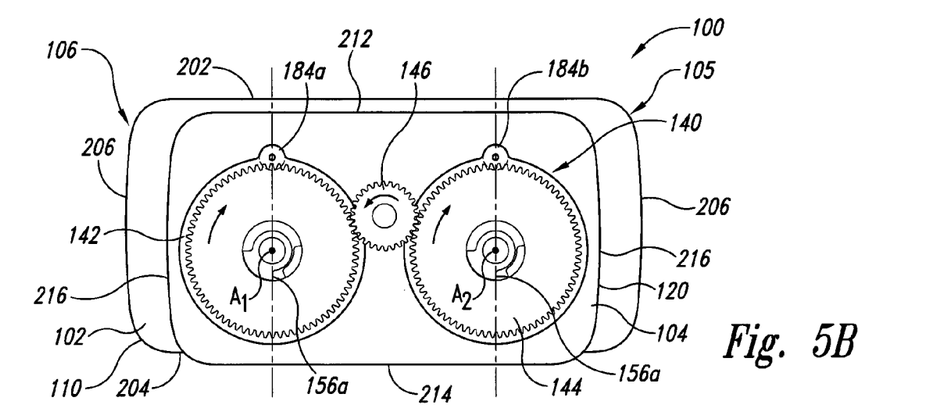
Figure 5C:
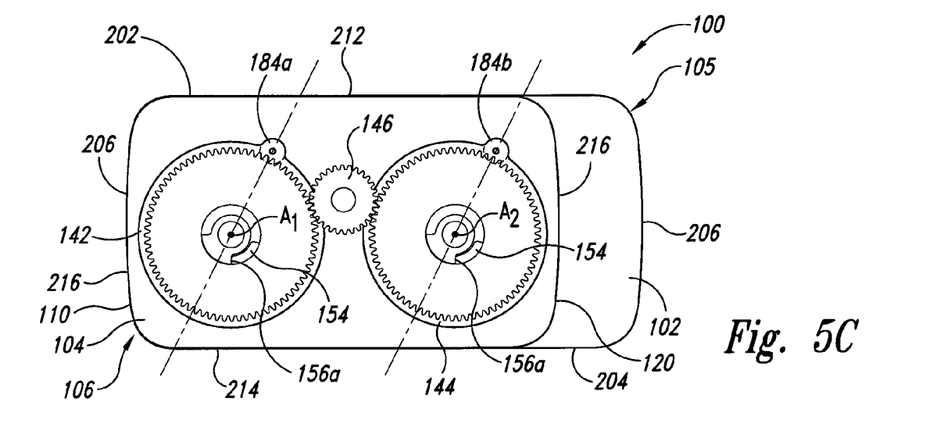

FIGS. 5A-5C are partially schematic, transparent, top plan views of the mobile device 100 illustrating the device moving from the first or Passive Mode to the second or Semiactive Mode. Referring first to FIG. 5A, for example, the mobile device 100 is in the first mode and the second component 104 is positioned adjacent to the first end 105 of the first component 102. In this configuration, the first and second interface portions 184a and 184b are positioned above and to the left of the corresponding axes $A_1$ and $A_2$. The first housing 110 includes a first or top edge 202, a second or bottom edge 204, and sides 206 extending between the first and second edges 202 and 204. The second housing 120 includes a first or top edge 212, a second or bottom edge 214, and sides 216 extending between the first and second edges 212 and 214. The first and second edges 202 and 204 of the first housing 110 are at least generally parallel with the first and second edges 212 and 214 of the second housing 120. Likewise, the sides 206 of the first housing 110 are generally parallel with the sides 216 of the second housing 120.

FIG. 5B illustrates an intermediate position of the second component 104 relative to the first component 102 as the mobile device 100 is being changed from the first mode to the second mode. The second component 104 is rotatably moved relative to the first component 102 and is approximately halfway between the first end 105 and the second end 106 of the first component 102. As mentioned previously, the gear assembly 140 drives the movement of the second component 104 relative to the first component 102. More specifically, as a user (not shown) slides the second component 104 from the first position toward the second position, the first and second gears 142 and 144 rotate clockwise (and the third gear 146 rotates counterclockwise) and the first and second interface portions 184a and 184b rotate clockwise, thereby rotatably moving the second component 104. In addition, the urging assembly 160 (FIGS. 3-4B) helps drive or urge the interface portions 184a and 184b to the desired position. For example, the spring force from the first and second urging member 162a and 164b (FIG. 3) helps rotatably move or drive the respective first and second interface portions 184a and 184b to the desired orientation after the user initiates the process. As shown in FIG. 5B, rotating the first and second gears 142 and 144 in sync with one another keeps the top and bottom edges 212 and 214 of the second housing 120 generally parallel with the top and bottom edges 202 and 204 of the first housing 210 throughout the entire transition between the first and second modes.

Referring next to FIG. 5C, the second component 104 is positioned adjacent to the second end 106 of the first component 102 and the mobile device 100 is in the second or Semiactive Mode. The first and second interface portions 184a and 184b have rotated further clockwise such that the interface portions 184a and 184b are positioned above and to the right of the corresponding axes $A_1$ and $A_2$. As the first and second gears 142 and 144 rotate, the respective alignment or indexing features 154 rotate until the alignment features 154 engage the corresponding first stops 156a. As mentioned previously, the first stops 156a limit or prevent rotation of the gears 142 and 144 past a certain extent, and thereby help position the second component 104 at the desired position.

Figure 6A:
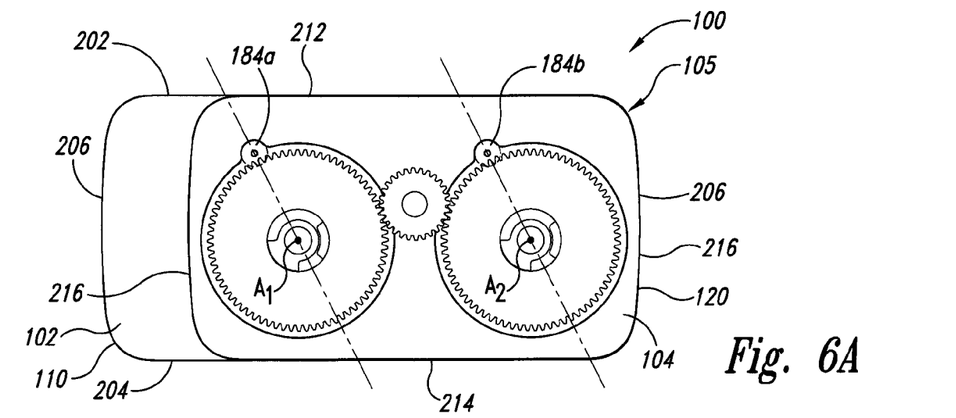
FIGS. 6A-6C are partially schematic, transparent, top plan views of the mobile device of FIGS. 1A-1C illustrating the device moving from the first operating mode to the third operating mode.
Figure 6B:
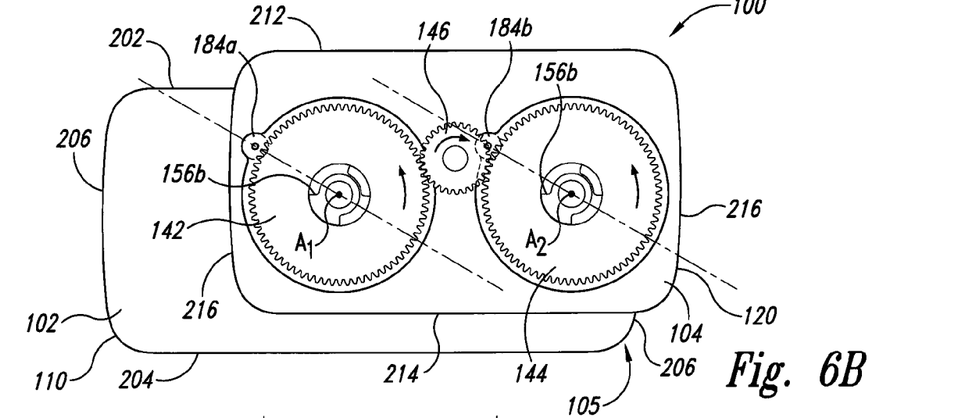
Figure 6C:
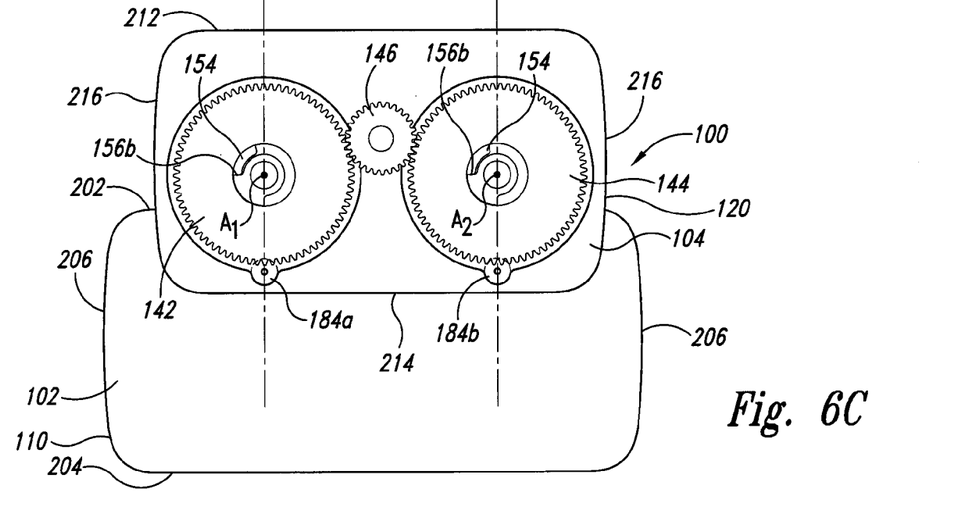

FIGS. 6A-6C are partially schematic, transparent, top plan views of the mobile device 100 illustrating the device moving from the first mode to the third or Active Mode. Referring first to FIG. 6A, for example, the mobile device 100 is in the first mode and the second component 104 is positioned adjacent to the first end 105 of the first component 102. This configuration is identical to the arrangement discussed above with reference to FIG. 5A.

FIG. 6B illustrates an intermediate position of the second component 104 relative to the first component 102 as the mobile device 100 is being changed from the first mode to the third mode. In this position, the second component 104 is rotatably moved relative to the first component 102 such that the second component is outboard of the first end 105 and the first or top edge 202 of the first housing 110.

More specifically, as a user (not shown) slides the second component 104 from the first position toward the third position, the first and second gears 142 and 144 rotate counterclockwise (and the third gear 146 rotates clockwise). The first and second interface portions 184a and 184b accordingly rotate counterclockwise with the first and second gears 142 and 144, respectively. As shown in FIG. 6B, and as described above with respect to FIG. 5B, rotating the first and second gears 142 and 144 in sync with one another keeps the top and bottom edges 212 and 214 of the second housing 120 generally parallel with the top and bottom edges 202 and 204 of the first housing 210 throughout the entire transition between the first and third modes. Moreover, as mentioned previously, the urging assembly 160 (FIGS. 3-4B) helps drive or urge the interface portions 184a and 184b to the desired position. For example, the spring force from the first and second urging member 162a and 164b (FIG. 3) helps rotatably move or drive the respective first and second interface portions 184a and 184b to the desired orientation after the user merely begins moving the second component 104 toward the desired location. Accordingly, the user only needs to initiate the rotating process and the gear assembly 140 can complete the process.

Referring next to FIG. 6C, the second component 104 is offset and above a portion of the first component 102 in the third or Active Mode. The first and second interface portions 184a and 184b have rotated counterclockwise through almost a full 180 degrees and are positioned approximately directly below and in line with the corresponding axes $A_1$ and $A_2$. As mentioned previously, the urging assembly 160 (FIGS. 3-4B) helps drive or urge the interface portions 184a and 184b to the desired orientation. The alignment or indexing features 154 are engaged with the corresponding second stops 156b, and thereby limit or prevent further rotation of the gears 142 and 144 in the counterclockwise direction. For example, the second stops 156b prevent the interface portions 184a and 184b from rotating past 180 degrees.

In each of the examples described above with reference to FIGS. 5A-6C, the mobile device 100 can be returned to the first or Passive Mode by merely reversing the above-described steps. For example, referring to FIGS. 6A-6C, the second component 104 can rotatably move from the third mode (as shown in FIG. 6C) back to the first mode (as shown in FIG. 6A) by rotating the various portions of the gear assembly 140 in a direction opposite to that described above.

Figure 7:
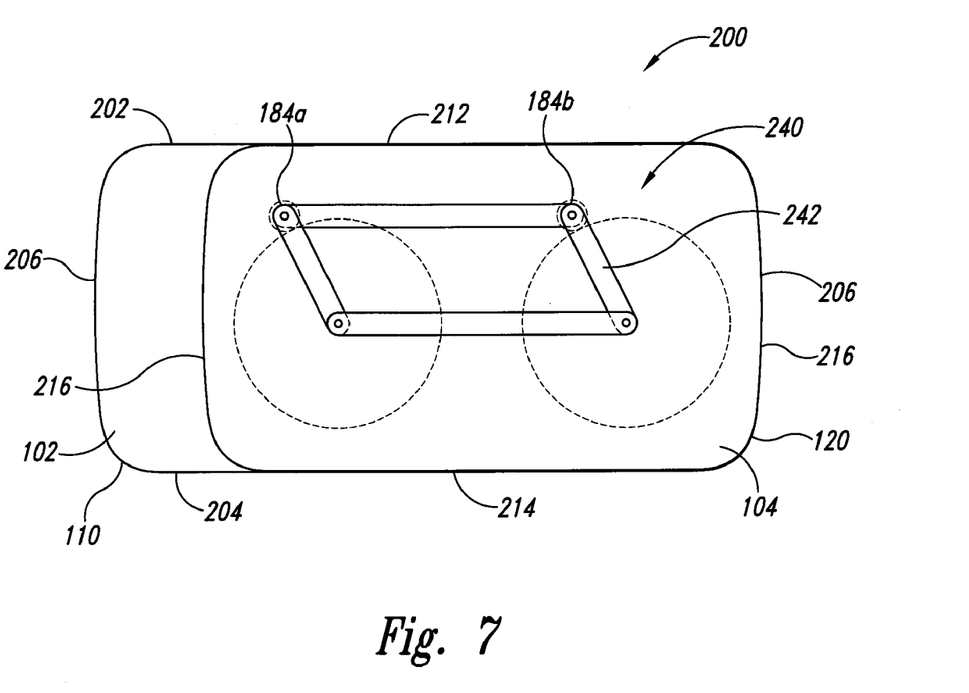
FIG. 7 is a partially schematic, transparent top plan view of a mobile device configured in accordance with another embodiment of the disclosure.

FIG. 7 is a partially schematic, transparent top plan view of a mobile device 200 configured in accordance with another embodiment of the disclosure. A number of components of the mobile device 200 are not shown for purposes of illustration. The mobile device 200 can be generally similar to the mobile device 100 described above, and can include many of the same features and advantages of the mobile device 100. For example, the mobile device 200 can have the same three operating modes or states as the mobile device 100 described above.

The mobile device 200 differs from the mobile device 100 described above in that the mobile device 200 includes a different mechanism 240 to rotatably move the second component 104 relative to the first component 102 between the three different operating modes or position. More specifically, the mechanism 240 comprises a four-bar linkage 242 (shown schematically) in lieu of the gears 142/144/146 to rotatably move the second component 104 relative to the first component 102. The four-bar linkage 242 is operably coupled to the urging assembly 160 (FIG. 3) and configured to rotatably move the interface features 184a and 184b in generally the same fashion as the gear assembly 160 described above. In will be appreciated that the four-bar linkage 242 shown in FIG. 7 is merely representative of a four-bar linkage, and the dimensions and/or arrangement of certain features may be modified or changed based upon the particular application. In still other embodiments, the mechanism 240 can include other types of linkages and/or the linkage may have different features or a different arrangement.

B. CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application.

The above Detailed Description of examples of the system is not intended to be exhaustive or to limit the system to the precise form disclosed above. While specific examples for the system are described above for illustrative purposes, various equivalent modifications are possible within the scope of the system, as those skilled in the relevant art will recognize. While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the system provided herein can be applied to other systems, not necessarily the system described above. The elements and acts of the various examples described above can be combined to provide further implementations of the system. Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Other changes can be made to the system in light of the above Detailed Description. While the above description describes certain examples of the system, and describes the best mode contemplated, no matter how detailed the above appears in text, the system can be practiced in many ways. Details of the system may vary considerably in its specific implementation, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the system under the claims.

While certain aspects of the disclosure are presented below in certain claim forms, the applicant contemplates the various aspects of the disclosure in any number of claim forms. Accordingly, the applicant reserves the right to add additional claims after filing the application to pursue such additional claim forms for other aspects of the invention.

We claim:
1. A mobile communication device, comprising:
 a first component having a front side and a first periphery edge;
 a second component operably coupled to the first component and rotatably movable about the front side of the first component into at least first, second, and third operating positions,
  wherein the second component includes a second periphery edge, and
  wherein the first and second periphery edges remain generally parallel with each other as the second component rotatably moves between the first, second, and third operating positions; and
 a gear assembly coupled among the first and second components and configured to rotatably move the second component relative to the first component, wherein the gear assembly comprises a gear assembly portion carried by the first component, the gear assembly portion including— a first urging member;
a second urging member;
a first arm portion having a first end mated with and rotatably coupled to a first engagement feature carried by the first component and a second end coupled to the first urging member; and
a second arm portion having a first end mated with and rotatably coupled to a second engagement feature carried by the first component and a second end coupled to the second urging member.

2. The mobile device of claim 1 wherein the gear assembly comprises a second gear assembly portion, and wherein the gear assembly further comprises:
a first gear assembly portion carried by the second component, the first gear assembly portion including—
a first gear and a second gear adjacent to and generally coplanar with each other;
a third gear between and in contact with the first and second gears;
a first rotating feature carried by the first gear, and a second rotating feature carried by the second gear, wherein the first and second rotating features each include—
a front side in contact with the corresponding gear and a back side facing away from the corresponding gear; and
an engagement feature projecting away from the back side of the rotating feature and toward the first component.

3. The mobile device of claim 2 wherein the first and second gears are identical or approximately identical, and wherein the first and second gears have a first diameter, and further wherein the third gear has a second diameter less than the first diameter.

4. The mobile device of claim 2 wherein the first and second gears are configured to rotate in sync with each other in a first direction, and wherein the third gear is configured to rotate in a second direction opposite to the first direction.

5. The mobile device of claim 2 wherein:
the first urging member includes a first end fixedly attached to a base portion of the first component and a second end coupled to the first arm portion, and wherein the first urging member is configured to urge the first arm portion toward one or more desired angular orientations; and
the second urging member includes a first end fixedly attached to the base portion of the first component and a second end coupled to the second arm portion, and wherein the second urging member is configured to urge the second arm portion toward one or more desired angular orientations relative to the first arm portion.

6. The mobile device of claim 5 wherein the first and second urging members comprise generally V-shaped torsion springs.

7. The mobile device of claim 2 wherein:
the first rotating feature further comprises a first alignment feature, and the second rotating feature further comprises a second alignment feature, and wherein the first and second alignment features are configured to rotate in sync with the first and second gears, respectively; and
the second component further comprises one or more stops proximate to each of the first and second rotating features and positioned to engage the corresponding first and second alignment features and inhibit rotational movement of the first and second gears.

8. The mobile device of claim 7 wherein:
the second component includes a first stop and a second stop circumferentially offset from the first stop;
the first stop is positioned to inhibit rotational movement of the first and second gears when the second component is at the second operating position relative to the first component; and
the second stop is positioned to inhibit rotational movement of the first and second gears when the second component is at the third operating position relative to the first component.

9. The mobile device of claim 7 wherein the one or more stops are integral components of a housing of the second component.

10. The mobile device of claim 1 wherein the second component is configured to move along a curved path relative to the first component between (a) the first and second operating positions, and (b) the first and third operating positions.

11. The mobile device of claim 1 wherein the first periphery edge is a top edge of the first component, and the second periphery edge is a top edge of the second component.

12. The mobile device of claim 1, further comprising a detent assembly configured to temporarily maintain the second component at a desired position relative to the first component.

13. The mobile device of claim 12 wherein the detent assembly comprises:
a first magnet carried by the first component; and
a second magnet carried by the second component and positioned relative to the first magnet to temporarily maintain the second component in the first operating position.

14. The mobile device of claim 1 wherein:
the first component further comprises a keyboard; and
the second component further comprises a display.

15. The mobile device of claim 1, further comprising:
a display;
a communications component configured to exchange communications with the telecommunications network;
user input and output components, including audio components configured to facilitate voice communications and a keypad configured to facilitate text communications;
memory; and
a processor coupled among the display, the communications component, the memory, and the user input and output components.

16. A mobile communication device for use with a wireless telecommunications network, the mobile device comprising:
a first component having a front side aligned with a first plane;
a second component carried by the first component and having a display aligned with a second plane generally parallel to the first plane; and
a gear assembly operably coupled to the first and second components and configured to rotatably move the second component relative to the first component into discrete first, second, and third operational positions, wherein the gear assembly comprises—
a first gear rotatable about a first gear axis;
a first key feature carried by the first gear and projecting away from a back side of the first gear toward the first component;
a second gear rotatable about a second gear axis generally parallel with the first gear axis;
a second key feature carried by the second gear and projecting away from a back side of the second gear toward the first component, wherein the first and second key features are configured to rotatably move in sync with the first and second gears, respectively;

a first arm portion rotatably coupled to the first key feature;

a second arm portion rotatably coupled to the second key feature, wherein the first and second arm portions are configured to rotate about first and second arm axes, respectively, generally parallel with the first and second gear axes;

a first spring coupled between a base portion of the first component and the first arm portion; and a second spring coupled between the base portion of the first component and the second arm portion, wherein the first and second springs are positioned to urge the first and second arm portions about the first and second arm axes, respectively; and a third gear in contact with both the first and second gears and rotatable about a third gear axis generally parallel with the first and second gear axes;

wherein front sides of the first, second, and third gears are generally coplanar along a third plane, and wherein the third plane is generally parallel with the first and second planes, and wherein the display remains generally aligned with the first and second planes as the second component moves between the first, second, and third operational positions.

17. The mobile device of claim 16 wherein the display is a first display, and wherein:

the first component further comprises a keyboard and a second display positioned on the front side and at least proximate to an edge of the first component, wherein the second display is aligned with the first plane.

18. The mobile device of claim 16 wherein the second component is configured to move along a nonlinear path between the first, second, and third operational positions.

19. The mobile device of claim 16 wherein the gear assembly is configured to rotatably move the second component between the first, second, and third operational positions via user manipulation of the second component.

20. The mobile device of claim 16 wherein the first gear is configured to rotate about the first axis at a first rotational speed, and the second gear is configured to rotate about the second axis in the same direction as the first gear at a second rotational speed identical or approximately identical to the first rotational speed, and wherein the third gear is configured to rotate in a direction opposite to the first and second gears.

21. The mobile device of claim 16, further comprising:

two or more stand-offs positioned to inhibit rotational movement of the gear assembly when (a) the second component is at the second operational position relative to the first component, and (b) the second component is at the third operational position relative to the first component.

* * * * *